April 20, 1965 L. S. WILLIAMS 3,179,191

CONDITION RESPONSIVE INSTRUMENTS

Filed Dec. 31, 1962 2 Sheets-Sheet 1

INVENTOR.
LAWRENCE S. WILLIAMS
BY
Marshall, Wilson, Click & Yeasting
~attorneys~

CONDITION RESPONSIVE INSTRUMENTS
Filed Dec. 31, 1962 2 Sheets-Sheet 2
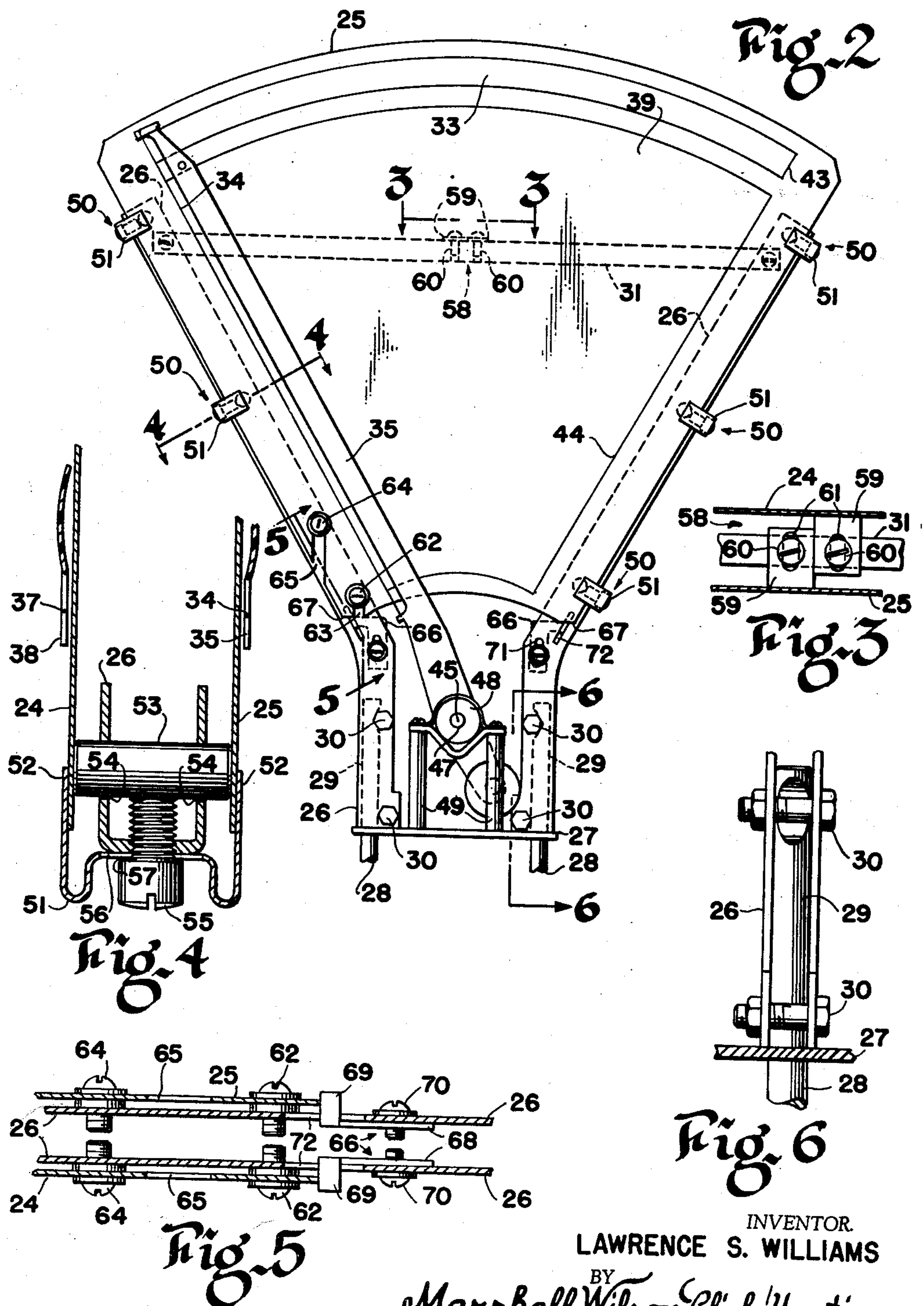
INVENTOR.
LAWRENCE S. WILLIAMS
BY
Marshall, Wilson, Click & Yeasting
attorneys

United States Patent Office 3,179,191

Patented Apr. 20, 1965

3,179,191

CONDITION RESPONSIVE INSTRUMENTS

Lawrence S. Williams, Toledo, Ohio, assignor to Toledo Scale Corporation, Toledo, Ohio, a corporation of Ohio Filed Dec. 31, 1962, Ser. No. 248,693
14 Claims. (Cl. 177—167)

This invention relates to condition responsive instruments and more particularly to improved chart assemblies for such instruments and especially for weighing scales.

The objects of this invention are to improve weighing scales and particularly to improve fan weighing scales, to facilitate the adjustment of charts in such scales relative to their indicators, to simplify the construction of such scales, to minimize parallax in condition responsive instruments, to provide, in condition responsive instruments, means for adjusting two charts, e.g., back and front indication charts, as one relative to the planes of their indicators, and to provide chart assemblies for weighing scales in which the charts are replaceable without recalibration.

One embodiment of this invention enabling the realization of these objects is a fan weighing scale having two charts, one for front and the other for back indication, and two load responsive indicators which move together as one across the faces of the respective charts as is well known in the art to provide identical indications from the front and back of the scale. Means are provided for positioning the charts flat at five edge locations and at the center to make the charts parallel to the planes of the indicators and for so positioning the charts relative to the indicators that the zero and full load positions on the charts and of the indicators correspond.

In accordance with the above, one feature of this invention resides in minimizing parallax by making the charts parallel and very close to the planes of the indicators and this by easily operable adjustment means. The indicators are closer to their charts than in any known prior condition responsive instrument. The adjustment means, which is a leveling device, provides fast, restorable alignment by means of mechanism having superior simplicity.

Another feature resides in the ability of the adjustment means to position the charts together as one relative to the planes of their respective indicators.

A further feature resides in memory or index mechanism in the adjustment means which allows the charts to be replaceable without recalibration.

Still another feature resides in the simplified construction and ease of operation of the adjustment means by means of which the charts are readily so positioned relative to the indicators that the zero and full load positions of the charts and indicators exactly correspond.

The above and other objects and features of this invention will be appreciated more fully from the following detailed description when read with reference to the accompanying drawings wherein:

FIG. 2 is a fragmentary, front elevational view as seen from a position to the right of the scale shown in FIG. 1;

FIG. 3 is an enlarged, horizontal sectional view taken along the line 3—3 of FIG. 2;

FIG. 4 is an enlarged, sectional view taken along the line 4—4 of FIG. 2;

FIG. 5 is an enlarged, sectional view taken along the line 5—5 of FIG. 2; and

FIG. 6 is an enlarged, vertical sectional view taken along the line 6—6 of FIG. 2.

Figure 1:
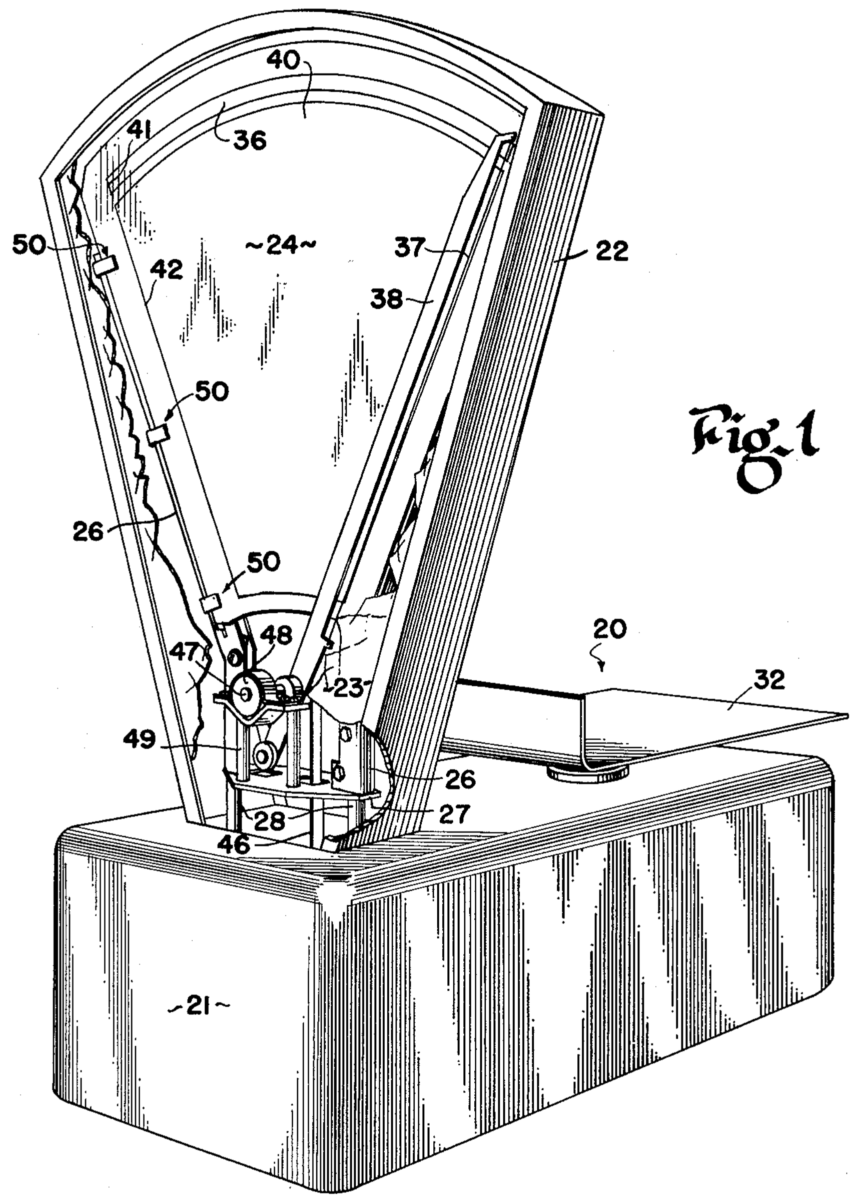
FIG. 1 is a perspective view of a fan weighing scale with parts broken away to reveal mechanism shown fragmentarily in the interior.

Referring to the drawings, a fan spring scale 20 includes a base housing 21 and a chart housing 22 extending upwardly therefrom. The chart housing 22 defines a pair of window openings for front and back indication which are closed by glass windows 23 suitably supported by the chart housing 22 and one of which is shown in FIG. 1. The housings 21 and 22 and the respective weighing and indicator assemblies contained therewithin are disclosed fully in U.S. patent application Serial No. 246,026, filed December 20, 1962 in the name of L. S. Williams. The chart assembly of the invention is disclosed herein as being incorporated in the mechanism shown and described in the above U.S. application Serial No. 246,026.

Stationary charts 24 (FIG. 1) and 25 (FIG. 2) are viewed through the respective windows, the charts 24 and 25 being carried by a pair of mounting channels 26 carried in turn on a horizontal plate 27. The horizontal plate 27 corresponds to a similar plate shown and described in the above U.S. application Serial No. 246,026 and is carried by two posts 28 extending upwardly from the base of the scale 20 as also disclosed in such application. The posts 28 are provided with extensions 29, above the horizontal plate 27, which function as supports for the mounting channels 26, nuts and bolts 30 squeezing the bottom portions of the flanges of the channels 26 together so that such bottom portions of the channels embrace and grip the post extensions 29 and are thereby anchored in place. The channels 26 open inwardly and extend upwardly from the horizontal plate 27 in the general shape of a fan and are so spaced that edges of the charts 24 and 25, which charts also are fan-shaped, can be mounted on the channels 26, there being two channels 26 one for the corresponding side edges of the two charts 24 and 25 and the other for the opposite side edges of the two charts. That is, one of the channels 26 provides a mounting common to the corresponding side edges of the two charts and the other channel 26 provides a mounting common to the opposite side edges of the two charts. The channels 26 at their upper ends are provided with a reinforcing, horizontal bar 31.

The scale 20 functions like any ordinary fan scale, i.e., the weight of an article placed upon a platter 32, operatively connected to the above weighing assembly, is indicated in a weight area 33 on the chart 25 by a reading line 34, on a load responsive indicator 35, stretched adjacent the chart 25 and also in a weight area 36 on the chart 24 by a reading line 37, on a load responsive indicator 38, stretched adjacent the chart 24, and the value of such article, computed in accordance with such weight and the price per unit weight of such article, also is indicated in two places by the indicators 35 and 38 in value areas 39 and 40 on the respective charts. Price legends (not shown) on the charts 24 and 25 and on the indicators 35 and 38 are used in the usual way as a means to select the proper columns of value figures on the charts which correspond to the price of the article being weighed. The indicators 35 and 38 move together as one across the faces of the respective charts as is well known in the art to provide identical indications from the front and back of the chart housing 22. The weight area 36 on the chart 24 is provided with a zero line underneath the reading line 37 (scale in zero load position) and a full capacity line 41 and the value area 40 on the chart 24 is provided with a zero line underneath the reading line 37 and a full capacity line 42. The weight area 33 on the chart 25 is provided with a zero line underneath the reading line 34 (scale in zero load position) and a full capacity line 43 and the value area 39 on the chart 25 is provided with a zero line also underneath the reading line 34 and a full capacity line 44. Imaginary extensions of the zero and full capacity lines on each of the charts meet at the vertex of a triangle which coincides with the axis 45 (FIG. 2) of rotation of the indicators 35 and 38. As hereinafter described, such zero and full capacity lines serve as index means for aligning the charts with their respective indicators.

The force of gravity acting on a load placed upon the platter 32 is transmitted to a lever, in the above weighing assembly, which drives the indicators 35 and 38 through means including a strut 46 (FIG. 1) as shown and described in the above U.S. patent application Serial No. 246,026, the indicators 35 and 38 being mounted on a shaft 47 journaled in ball bearings 48 supported atop posts 49 which are supported in turn on the horizontal plate 27 all as shown and described fully in such application. Accordingly, the indicators 35 and 38 move together about the axis 45 of the shaft 47 as one across the faces of the respective charts as driven by the load responsive strut 46.

Means are provided for positioning the charts 24 and 25 flat at five edge locations and at the center to make the charts parallel to the planes of the indicators and for so positioning the charts relative to the indicators that the zero and full load positions on the charts and of the indicators correspond.

The means for positioning the charts 24 and 25 flat at the five edge locations includes a leveling device 50 at each of such edge locations (three spaced along one side and two spaced along the other side). Since the leveling devices 50 are each identical to each other, only one will be described and it includes a resilient clip 51, shaped as shown in FIG. 4, having legs 52 which grip the edges of the charts 24 and 25 and urge them into engagement with the respective ends of a pin 53 that is slidably mounted in aligned holes 54 in the flanges of the respective channel 26. This resiliently clips the charts 24 and 25 to the channels 26. The pin 53 is held in an adjusted position by means of a set screw 55, which is threaded through the channel 26, engages the pin 53, and extends through a wide slot 56 in the clip 51, the set screw 55 being provided with a shoulder 57 that always is spaced from the clip 51 so that the clip 51 is free to be moved to the left or right as viewed in FIG. 4 as limited by the size of the slot 56.

The charts 24 and 25 are adjusted both at the same time relative to the planes of the indicators, i.e., perpendicularly to the indicators, by loosening one of the set screws 55 and grasping the respective clip 51 to move charts 24 and 25 until each is about equally spaced, in the areas controlled by the respective clip 51, from its respective indicator as determined by the eye and as shown in FIG. 4. The pin 53 slides in its channel holes 54 while the adjustment is being made. The set screw 55 then is tightened to hold the adjustment. This procedure is repeated by trial and error at the four other clips 51. Not only are the leveling devices 50 easy to operate, they also, in conjunction with a leveling device 58 (FIG. 3) at the center of the charts, minimize parallax by enabling the charts 24 and 25 to be parallel and very close to the planes of the indicators. The indicators 35 and 38 are closer to their charts than in any known prior weighing scale; it is easy to sight along the edges of the charts as shown in FIG 4 and adjust the charts until the clearance appears perfect. This minimizing of parallax is one of the features of the invention, doing it by easily operable adjustment means is another feature, and adjusting both charts together as one is still another feature.

The means for positioning the charts 24 and 25 flat at the center includes the leveling device 58 which comprises a pair of adjustment plates 59 (FIG. 3), one for each chart, which are attached to the horizontal bar 31 each by means of a screw 60 which extends through an oversize slot 61 in the plate 59 and is threaded into the bar 31. The charts 24 and 25 are bowed inwardly when they are made and the plates 59 function to flatten the charts by forcing them outwardly. The adjustment is made when the screws 60 are loose by moving the plates 59 outwardly against the charts by trial and error until the charts are parallel to the planes of the indicators as determined by sighting between the charts and the indicators while moving the indicators back and forth by hand. The screws 60 then are tightened to retain the adjustments. Another of the features of the invention resides in the ability of the leveling device 58 together with the leveling devices 50 to provide a fast, restorable chart alignment by means of mechanism having superior simplicity.

It is not necessary that both of the charts function as charts or as charts of the type described above. For example, the back chart can be a blank sheet to provide only front indication, or the back chart can be provided with weight figures and graduations only to provide only weight indications at the back of the scale.

The means for so positioning the charts 24 and 25 relative to the indicators that the zero and full load positions on the charts and of the indicators correspond includes a pair of screws 62 one for each of the charts 24 and 25 which extend through open-ended slots 63 in the respective charts and are threaded into the channel 26. The charts 24 and 25 each is pivotable about the axis of its respective screw 62. A second pair of screws 64 is provided one screw 64 for each of the charts and functions to help hold the adjustment. The second screws 64 extend through open-ended slots 65 in the charts and are threaded into the channel 26. Before the adjustment is made, supplemental supports 66, two for each chart, are withdrawn from engagement with horizontal, bottom surfaces 67 on the charts. Each of the supplemental supports 66 includes a body portion 68 and a finger 69 bent at a right angle out of the plane of the body portion 68 and is attached to its respective channel 26 by means of a screw 70 which extends through an oversize slot 71 in the channel 26 and is threaded into the body portion 68. The fingers 69 of the supplemental supports 66 each extends through and is guided in a slot 72 in its respective channel 26. When the screws 70 are loose, the fingers 69 are slidable in the channel slots 72 into or out of engagement with the horizontal, bottom surfaces 67 on the charts.

One of the features of the invention resides in the simplified construction and ease of operation of the above adjustment means by means of which the charts are readily so positioned relative to the indicators that the zero and full load positions of the charts and indicators exactly correspond. This is accomplished by loosening or removing if necessary screws 64, loosening screws 62 and moving the charts 24 and 25 upor down or about the axes of screws 62 until the respective indicator reading lines 34 and 37 coincide with the respective chart zero lines when the indicators are in zero position and until the respective indicator reading lines 34 and 37 coincide with the respective chart full capacity lines when the indicators are in full load positions. As above described, the zero and full capacity chart lines serve as index means for aligning the charts with their respective indicators. This adjustment of the charts up or down or about the axes of screws 62 so positions the charts that the imaginary extensions of the zero and full capacity lines on each of the charts meet at the vertex of a triangle which coincides with the axis 45 (FIG. 2) of rotation of the indicators 35 and 38. The screws 62 and 64 then are tightened to maintain the adjustment.

Another feature resides in the "memory" of the supplemental supports 66 which allows the charts to be replaceable without recalibration. After the above adjustments are made positioning the charts relative to the indicators so that the zero and full load positions of the charts and indicators exactly correspond, the supplemental supports 66 are moved upwardly as described above until the fingers 69 engage the horizontal, bottom surfaces 67 on the charts. The screws 70 then are tightened to maintain the adjustment. The supports 66 also help support the charts. If for any reason one or both of the charts are replaced, the new chart or charts simply are placed in the scale so that the horizontal, bottom surfaces 67 on the charts rest upon the fingers 69 of the supplemental supports 66, i.e., the supplemental supports serve as index means for locating substitute charts. This eliminates the need for moving the substituted charts up or down or about the axes of screws 62 until the charts are aligned with the indicators, i.e., the charts are replaceable without recalibration.

The charts 24 and 25 are placed in the scale and adjusted in the following manner, it being assumed that the supplemental supports 66 have not been previously adjusted: First, the four supplemental supports 66 are moved to their lowermost positions. Then screws 60, 62 and 64 are loosened and the charts are slid into place with their side edges between the ends of the five pins 53 and the legs 52 of the five clips 51 and with the chart slots 63 and 65 receiving the screws 62 and 64, respectively. The charts are moved up or down or about the axes of the respective screws 62 to align the zero and full capacity index lines on the charts with the respective indicator reading lines as described above and screws 62 and 64 are tightened to maintain the adjustment. The five set screws 55 are loosened and the five clips 51 are moved to the left or right as viewed in FIG. 4 until the charts are adjusted (both at the same time) relative to the planes of the indicators, i.e., perpendicularly to the indicators, as described above. After each adjustment, the respective screw 55 is tightened to hold the adjustment. Then, the plates 59 (FIG. 3) are moved outwardly against the inwardly bowed charts until the charts are parallel to the planes or the paths of movement of the indicators as also described above to flatten the charts. The screws 60 are tightened to hold the adjustment. Finally, the supplemental supports 66 are moved upwardly until their fingers 69 engage the horizontal, bottom chart surfaces 67.

It is to be understood that the above description is illustrative of this invention and that various modifications thereof can be utilized without departing from its spirit and scope.

Having described the invention, I claim:

1. In a condition responsive instrument, in combination, a generally flat chart, mounting means for the chart, and a condition responsive indicator movable across the face of the chart, the mounting means including a plurality of chart adjusting and holding means for moving the chart toward and away from the indicator at a plurality of edge locations and at a portion of the chart intermediate said edge locations, to make the chart parallel and close to the plane of the indicator, and for holding the chart stationary in its adjusted position.

2. In a condition responsive instrument, in combination, two generally flat charts, mounting means for the charts, the charts being spaced apart, and two condition responsive indicators movable as one each across the face of its respective chart, the mounting means including a plurality of chart adjusting and holding means for moving each chart toward and away from its respective indicator at a plurality of edge locations and at portions of the charts intermediate said edge locations, to make the charts parallel and close to the planes of their respective indicators, and for holding the charts stationary in their adjusted positions.

3. In a condition responsive instrument according to claim 1 wherein the chart adjusting and holding means cooperating with said intermediate chart portion includes a member movable perpendicularly relative to the plane of the chart into engagement with the chart and said rest of the chart adjusting and holding means each includes a clip which grasps said edge portions of the chart.

4. In a condition responsive instrument, in combination, a generally flat chart, mounting means for the chart, and a condition responsive indicator movable across the face of the chart, the mounting means including two spaced elongated members juxtaposed to side edges of the chart, at least one pin mounted to slide in each of the elongated members toward and away from the chart, clip means for clipping the chart to the pins, the chart being movable toward and away from the indicator by correspondingly moving the clip means, and fastening means for locking the pins and thus the chart in adjusted position.

5. In a condition responsive instrument, in combination, two generally flat charts, mounting means for the charts, and two condition responsive indicators one for each chart and both movable as one across the face of its respective chart, the mounting means including two spaced elongated members positioned adjacent side edges of the charts, slide means carried by the elongated members between the charts and mounted for movement normal to the planes of the charts, clip means for clipping the charts to the slide means, the charts being movable toward and away from their respective indicators by correspondingly moving the clip means, and means for locking the slide means and thus the charts in adjusted positions.

6. In a fan weighing scale, in combination, two fan charts, mounting means for the charts, and two load responsive indicators one for each chart and both movable as one across the face of its respective chart, the mounting means including means for positioning the charts flat at a plurality of edge locations and at portions of the charts intermediate said edge locations to make the charts parallel to the paths of movement of their respective indicators.

7. In a fan weighing scale according to claim 6 wherein the means for positioning the charts positions the charts flat at said plurality of edge locations both at the same time.

8. In a fan weighing scale, in combination, two fan charts, mounting means for the charts, and two load responsive indicators one for each chart and both movable as one across the face of its respective chart, the mounting means including two channels positioned adjacent and between side edges of the charts and opening inwardly, a plurality of pins carried by each of the channels and mounted for movement normal to the planes of the charts, a clip for each pin, the clips clipping the charts to the ends of the pins, the charts being movable toward and away from their respective indicators by moving the clips correspondingly, and a fastener for each pin carried by the respective channel to lock the pins and thus the charts in adjusted positions.

9. In a fan weighing scale, in combination, a generally flat chart having zero and full load index lines arranged in the general shape of the sides of a fan, mounting means for the chart, a load responsive indicator mounted to pivot about an axis and movable across the face of the chart, and a reading line carried by the indicator, the chart index lines when the chart is in operative position being aligned with said axis, the mounting means including fastener means for so releasably anchoring the chart that the chart is movable to align the respective index lines with the indicator reading line when the reading line is in its zero and full load positions and the mounting means further including supplemental support means which are movable into engagement with the chart to help support the chart and serve as index means for locating a substitute chart, whereby the chart is replaceable with a minimum amount of adjustment.

10. In a fan weighing scale, in combination, a generally flat chart having zero and full load index lines arranged in the general shape of the sides of a fan, mounting means for the chart, a load responsive indicator mounted to pivot about an axis and movable across the face of the chart, and a reading line carried by the indicator, the chart index lines when the chart is in operative position being aligned with said axis, the mounting means including fastener means for so releasably anchoring the chart that the chart is movable to align the respective index lines with the indicator reading line when the reading line is in its zero and full load positions, said fastener means including a screw received in an opening defined by the chart and about the axis of which the chart is pivotable to make the adjustment.

11. In a fan weighing scale, in combination, a generally flat chart having zero and full load index lines arranged in the general shape of the sides of a fan, mounting means for the chart, a load responsive indicator mounted to pivot about an axis and movable across the face of the chart, and a reading line carried by the indicator, the chart index lines when the chart is in operative position being aligned with said axis, the mounting means including friction means for holding the chart and fastener means for releasably anchoring the chart so that by overcoming the friction of the friction means the chart is movable to align the respective index lines with the indicator reading line when the reading line is in its zero and full load positions, said friction means including a plurality of resilient clips at edge locations on the chart.

12. In a fan weighing scale, in combination, a generally flat chart having zero and full load index lines arranged in the general shape of the sides of a fan, mounting means for the chart, a load responsive indicator mounted to pivot about an axis and movable across the face of the chart, and a reading line carried by the indicator, the chart index lines when the chart is in operative position being aligned with said axis, the mounting means including friction means for holding the chart and fastener means for releasably anchoring the chart so that by overcoming the friction of the friction means the chart is movable to align the respective index lines with the indicator reading line when the reading line is in its zero and full load positions, said fastener means including two screws received in openings defined by the chart, the chart being adjustable with respect to the axes of the screws when such screws are loose for making the adjustment.

13. In a fan weighing scale, in combination, a generally flat chart having zero and full load index lines arranged in the general shape of the sides of a fan, mounting means for the chart, a load responsive indicator mounted to pivot about an axis and movable across the face of the chart, and reading line carried by the indicator, the chart index lines when the chart is in operative position being aligned with said axis, the mounting means including friction means for holding the chart and fastener means for releasably anchoring the chart so that by overcoming the friction of the friction means the chart is movable to align the respective index lines with the indicator reading line when the reading line is in its zero and full load positions, said mounting means also including supplemental support means which are movable into engagement with the chart to help support the chart and serve as index means for locating a substitute chart, whereby the chart is replaceable with a minimum amount of adjustment.

14. In a condition responsive instrument, in combination, a generally flat chart, mounting means for the chart, and a condition responsive indicator movable across the face of the chart, the mounting means including a plurality of chart adjusting and holding clips for moving the chart toward and away from the indicator, to make the chart parallel and close to the plane of the indicator, and for holding the chart stationary in its adjusted position.

References Cited by the Examiner

UNITED STATES PATENTS

| | | | |
|---|---|---|---|
| 1,253,318 | 1/18 | Wetzel | 177—167 |
| 1,842,029 | 1/32 | King | 177—181 |
| 3,090,452 | 5/63 | Armstrong | 177—41 |

FOREIGN PATENTS

| | | |
|---|---|---|
| 103,965 | 8/26 | Austria. |

LEO SMILOW, *Primary Examiner.*